June 8, 1943.  W. R. DRAY  2,321,019
HARVESTER-THRESHER COMBINE
Original Filed Dec. 29, 1939
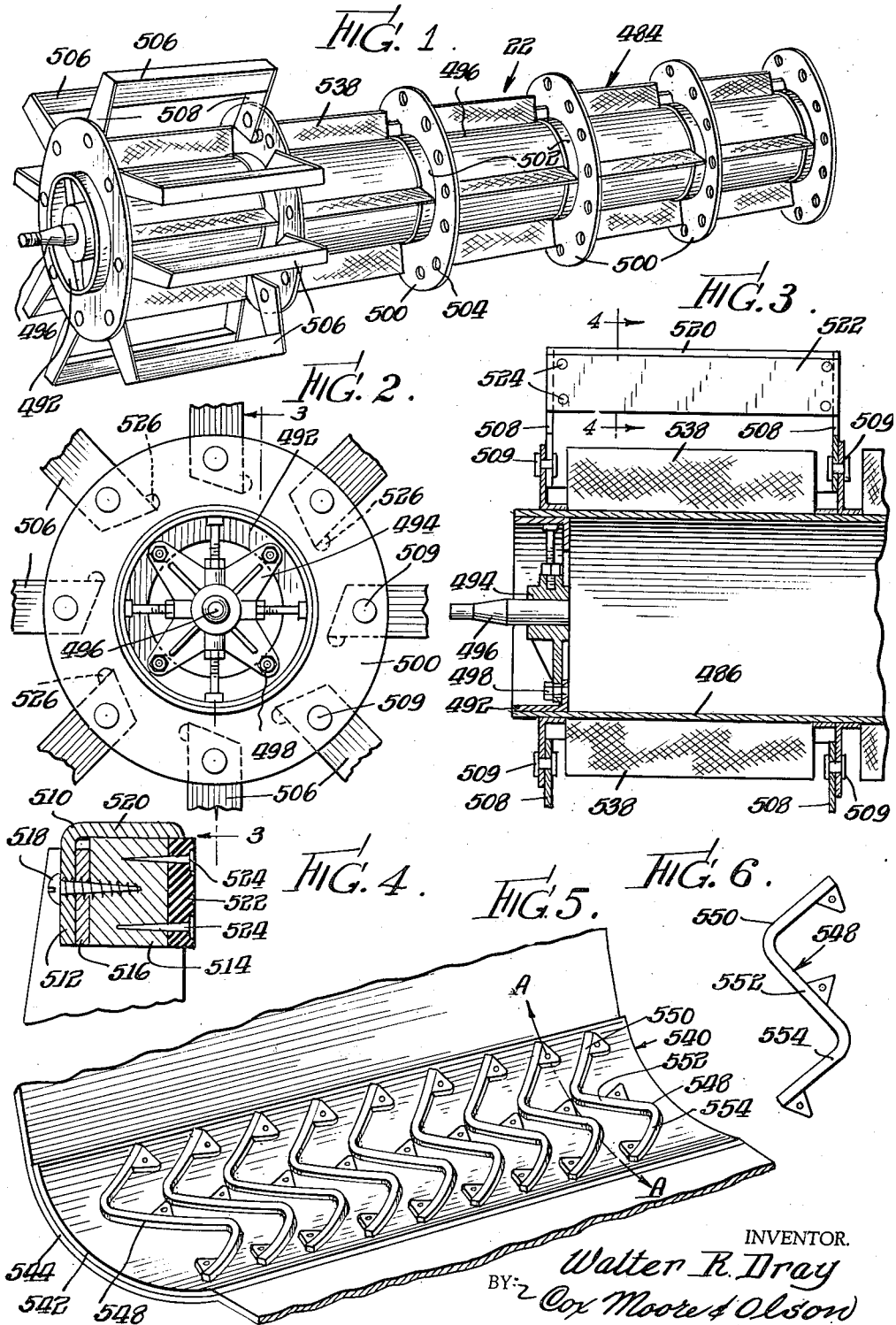
INVENTOR.
Walter R. Dray
BY Cox Moore & Olson
attys.

Patented June 8, 1943

2,321,019

UNITED STATES PATENT OFFICE 2,321,019

HARVESTER-THRESHER COMBINE

Walter R. Dray, Yorkville, Ill.

Original application December 29, 1939, Serial No. 311,572. Divided and this application October 2, 1940, Serial No. 359,331

13 Claims. (Cl. 130—27)

This invention relates to a harvesting-threshing machine or combine and more particularly to improvements in such a machine or combine.

The present application is a division of my copending application, Serial No. 311,572, filed December 29, 1939.

It is a general object of the present invention to provide an improved harvesting-threshing machine which may be of more inexpensive construction, yet compact and rigid in character and capable of efficiently handling, with a minimum of adjustment or replacement of elements, substantially all manner of crops in various conditions of growth and is of considerably less weight than prior harvesting-threshing machines.

The invention also contemplates the provision of a simplified and efficient threshing mechanism having a large cracking-threshing ratio, so that the mechanism may be operated at a large range of speeds for the most efficient threshing of all kinds of crops, and to provide a threshing mechanism with a "concave" which requires no adjustment relative to the threshing mechanism in order to efficiently handle all kinds of crops and which "concave" is of such construction as to eliminate cracking of the grain heretofore caused by the bouncing of the crushed grain through the walls or bars of the "concave."

Another object of the invention is to provide a threshing mechanism including a threshing cylinder of an inherently rigid character, eliminating the need for dynamic balancing means and providing threshing elements yieldable relative to the cylinder to prevent the jamming thereof by stones or other unyielding foreign matter which may be fed into the threshing mechanism.

Fig. 1 is a view in perspective of the threshing cylinder forming part of a threshing mechanism embodying the invention;

Fig. 2 is a fragmentary view in elevation of the threshing cylinder;

Fig. 3 is a substantially vertical section taken along the line 3—3 of Fig. 2;

Fig. 4 is a fragmentary view in section taken along the line 4—4 of Fig. 3;

Fig. 5 is a fragmentary view in perspective illustrating the concave which cooperates with the threshing cylinder to form the threshing mechanism;

Fig. 6 is a detail view illustrating the form of the bars which form part of the concave;

As shown in the drawing, the threshing mechanism 22 comprises a cylinder 484, Figs. 1 to 3, including a relatively large tubular shaft 486 of relatively thin sheet metal. A flanged disc 492 is positioned within each end of the tubular shaft 486 and is riveted thereto, and each disc provides a mounting for a spider 494 having a hub spindle 496 for the cylinder. The spider 494 is secured to the flanged disc 492 by the bolts 498, which may receive between the spider and the flanged disc suitable shims by which the hub spindle 496 may be alined with the axis of the tubular shaft 486. Discs 500 each having a hub flange 502 are secured to each end of the tubular shaft 486 and at a plurality of equally spaced points as by means of rivets or bolts passing through the hub flanges 502. The discs 500 are provided with a plurality of angularly spaced openings 504 alined longitudinally of the tubular shaft. Between each adjacent pair of discs is mounted a plurality of angularly spaced threshing bars 506, each swingably mounted on the adjacent discs 500 by levers 508 carrying pivot bolts or rivets 509 which are received in the alined openings 504 of said disc. Each swinging threshing bar 506 preferably comprises an L-shaped angle bar 510 of which the flange 512 extends radially of the cylinder and has secured to its outer face a block 514, preferably of wood. The block 514 being spaced from the flange 512 or recessed at its ends, permits a laterally extending portion 516 of each lever 508 to extend between the block and flange 512 and be clamped therebetween as by the screw 518 passing through openings in the flange 512 and the projection 516 and received in the block 514. The flange 520 of the angle bar 510 extends over the block 514 and partially over a rubber strip or block 522 fastened to the block 514 as by countersunk nails or rivets 524. The rubber blocks 522 provide radially extending portions serving as active threshing elements and provide surfaces of resilient material so that the active faces of the swinging, threshing bars will not wear off so easily.

The swinging, threshing bars are prevented from rotating relative to the threshing cylinder beyond certain radially extending threshing positions by stops 526 secured to the faces of the discs 500 and engaging the forward edges of the levers 508. As the threshing cylinder is rotated, the bars 506 are swung by centrifugal force into the radially extended threshing positions wherein the levers 508 engage the stops 526. It will be seen, however, that the threshing bars 506 are free to swing in a direction opposite to the direction of rotation of the threshing cylinder to protect the bars from damage if a large stone or other unyielding foreign matter is carried into the threshing mechanism and to prevent breakage of the cylinder or shaft due to sudden jamming of the cylinder.

Each of the shafts 496 at opposite ends of the tubular shaft 486 are journaled in suitable roller bearings.

The tendency of the threshing cylinder to act as a fan and blow too great a volume of air such as would carry grain out of the end of the machine is minimized or prevented by wind suppressing strips 538, preferably of canvas, extending longitudinally of the tubular shaft between adjacent pairs of discs 500, there being preferably a plurality of angularly spaced strips 538 between each pair of adjacent discs and the strips preferably extending radially of the cylinder in alinement with the threshing bars when said bars are in extended position. The wind suppressing strips 538 may be secured to the surface of the tubular shaft 486 or the discs 500 in any convenient manner.

The threshing cylinder 484 cooperates with a stationary concave element 540, Fig. 5, which includes a part circular sheet metal plate 542 secured to a generally circular housing portion 544.

Zig-zag bars 548, which are each of generally concave-convex configuration in a vertical plane, with the concave side facing upwardly, are welded, riveted, or otherwise affixed to the concave plate 542, and the upper edges of these bars are in relative close proximity to the path of the threshing bars 506. The zig-zag bars 548 in effect extend continuously from end to end of the threshing cylinder and each leg of each zig-zag bar preferably extends at an angle of substantially thirty degrees to the path of travel of the threshing bars 506. In other words, as shown in Fig. 5, the legs 550, 552 and 554 of each zig-zag bar 548 extend at substantially an angle of thirty degrees to the line "A—A" representing the path of travel of a threshing bar 506. Stated in still another way, the legs 550, 552, and 554 of each zig-zag bar 548 preferably extend at an angle of sixty degrees to the faces of the threshing bars 506. Applicant has found that the inclination of each leg of a zig-zag concave bar to the path of travel of the threshing bars at an angle of substantially thirty degrees is of great importance for minimizing cracking of the grain as compared to arrangements in which concave bars extend at forty-five to ninety degrees to the path of travel of the threshing bars. In fact, the zig-zag concave bar of approximately thirty degrees inclination so materially affects the performance of the threshing mechanism that it can efficiently handle all different types of crops without change in the spacing between the concave bars and the cylinder.

The threshing merit of a cylinder lies largely in its cracking-threshing ratio, which is the ratio between the speed at which the cylinder must be driven to get a satisfactory amount of grain out of the crop and the speed at which the cylinder must be driven to substantially eliminate cracking of the grain. It is this ratio, or margin of safety, between the two speeds that determine the practical efficiency of a threshing cylinder. The spike-toothed cylinder so commonly employed for threshing grain has an advantageous cracking-threshing ratio or margin of safety, but cylinders of this type have to have their concaves changed under various conditions, and worst of all, such threshing cylinders cut the grain leaves up so badly that they make cleaning of the grain very difficult and expensive. Also, these spike-toothed cylinders cannot handle damp, tough stalks very well. Applicant's threshing cylinder has not only an advantageous cracking-threshing ratio equal to that of the spike-toothed cylinder, which has the best ratio of all the prior threshing cylinders, but by virtue of its construction the concaves do not need to be changed under various conditions or for various crops; the threshing cylinder does not cut up green weeds and has been found to handle damp, tough straw very well and without clogging.

The tubular shaft 486 of the threshing cylinder being of relatively large diameter is of such greatly increased stiffness over the known threshing cylinders that it does not need to be dynamically balanced as in the case of prior cylinders.

Applicant has further provided in a harvesting-threshing machine or combine a light and yet rigid frame structure, providing at the same time relatively wide chambers for the threshing and separating mechanisms and supporting a rigid frame structure of maximum width consistent with the provision of a machine within the legal width limits for road transport.

It will be evident from the foregoing description that this invention has provided a simplified and efficient threshing mechanism having a large cracking-threshing ratio, so that the mechanism may be operated at a large range of speeds for the most efficient threshing of all kinds of crops, and has provided a threshing mechanism with a "concave" which requires no adjustment relative to the threshing mechanism, in order to efficiently handle all kinds of crops and which "concave" is of such construction as to eliminate cracking of the grain heretofore caused by the bouncing of the crushed grain back from the walls or bars of the "concave."

The invention has also provided a threshing mechanism including a threshing cylinder of an inherently rigid character, eliminating the need for dynamic balancing means and providing threshing elements yieldable relative to the cylinder to prevent the jamming thereof by stones or other unyielding foreign matter which may be fed into the threshing mechanism.

I claim:

1. In a threshing machine, a threshing mechanism, said threshing mechanism comprising a rotatable threshing member provided with a plurality of angularly spaced threshing elements, a stationary threshing element having an imperforate concave surface supporting a plurality of spaced zig-zag concave bars each comprising a plurality of sections, said bars being disposed in position spaced radially from the path of said threshing elements, and having each free-end section overlapping the adjacent section to form sets of successive passages each inclined to the path of movement of the threshing elements.

2. In a threshing machine, a threshing mechanism, said threshing mechanism comprising a rotatable threshing member provided with a plurality of angularly spaced threshing elements, a stationary concave threshing element extending longitudinally of the threshing member but in radially spaced relation to said elements and supporting a plurality of zig-zag concave bars, each bar being composed of a plurality of straight sections extending at the same angle to the path of movement of the threshing elements, and said bars being spaced longitudinally of the concave element to provide plural sets of successive passages inclined at the same angle to the path of movement of the threshing elements.

3. In a threshing machine, a threshing mechanism, said threshing mechanism comprising a rotatable threshing member provided with a plurality of angularly spaced threshing elements pivotally secured circumferentially of said threshing member and centrifugally swung outwardly of the circumference of said member upon rotation of said member, a stationary threshing element having an imperforate concave surface supporting a plurality of spaced zigzag concave bars each comprising a plurality of straight sections of which each section extends at an angle of substantially sixty degrees relative to the path of movement of the threshing elements, said bars being spaced radially from the path of said threshing elements when centrifugally swung outwardly from the circumference of said threshing member.

4. In a threshing machine, a threshing mechanism, said threshing mechanism comprising a tubular shell, means secured to the shell at opposite ends thereof for providing radially adjustable axles rotatably mounting said shell, means secured to said shell providing a plurality of longitudinally spaced annular flanges circumferentially of said shell, a plurality of angularly spaced bar-like threshing elements pivotally secured to adjacent ones of said annular flanges each for extension to a position radially of said shell upon rotation of said shell but for collapsing movement oppositely to the direction of rotation of the shell when subjected to an abnormal load.

5. In a threshing machine, a threshing mechanism, said threshing mechanism comprising a rotatable threshing member having an elongated relatively large tubular body portion and a plurality of sets of angularly spaced threshing elements, said sets of threshing elements being mounted in end-to-end substantially abutting relation longitudinally of said enlarged tubular portion, means mounting each of said threshing elements on the circumference of said tubular portion for movement from a radially extended operating position to a collapsed position adjacent the circumference of said tubular portion when engaging an abnormal load.

6. In a threshing machine, a threshing mechanism, said threshing mechanism comprising a rotatable threshing member having an elongated relatively large tubular body portion and a plurality of sets of angularly spaced threshing elements, said sets of threshing elements being mounted in end-to-end abutting relation longitudinally of said enlarged tubular portion, said threshing elements each comprising a rigid angle bar having one flange extending radially relative to said tubular portion and another flange extending circumferentially relative to said tubular portion, a filler block of relatively soft material secured to said bar and underlying said circumferential flange and provided with a facing portion of resiliently yieldable material underlying the outer edge of the circumferential flange.

7. In a threshing machine, a threshing mechanism, said threshing mechanism comprising a rotatable threshing member having a plurality of angularly spaced threshing elements, said threshing elements each comprising a rigid angle bar having one flange extending radially and another flange extending circumferentially of its path of rotation, and a facing portion of resiliently yieldable material underlying the circumferential flange and extending radially.

8. In a threshing machine, a threshing mechanism, said threshing mechanism comprising a rotatable threshing member having a plurality of angularly spaced threshing elements, said threshing elements each comprising a rigid angle bar having one flange extending radially and another flange extending circumferentially of its path of rotation, and a radially extending facing portion of resiliently yieldable material mounted on each bar, said circumferential flange at its forward edge, overlying said facing portion, and a concave in radially spaced relation to the path of movement of said bars and having rigid radial beater surfaces spaced apart.

9. In a threshing machine, a threshing mechanism, said threshing mechanism comprising a rotatable threshing member having a plurality of sets of angularly spaced threshing elements, said threshing elements each comprising a rigid angle bar having one flange extending radially and another flange extending circumferentially of its path of rotation, a facing portion of resiliently yieldable material underlying the circumferential flange, and a stationary concave threshing element past which the angularly spaced threshing elements move during rotation of said threshing member and against which the material is beaten when struck by the resiliently yieldable facing portions of said angularly spaced threshing elements, said stationary concave threshing element having a plurality of spaced zigzag concave bars disposed in position adjacent the path of said angularly spaced threshing elements and extending generally longitudinally of said path, said bars being spaced transverse to the path of movement of said angularly spaced threshing elements to form zigzag passages extending generally longitudinally of the path of movement of said angularly spaced threshing elements and inclined to said path of movement.

10. In a threshing machine, a threshing mechanism comprising a rotatable cylinder carrying a plurality of threshing elements spaced angularly relative to each other and spaced radially from the surface of said cylinder, said threshing elements each comprising a bar having a radially extending facing portion of resiliently yieldable material, and an imperforate concave in radially spaced relation to the path of movement of said bars, said concave carrying beater bars spaced transversely of the path of movement of said threshing elements and having radial beater surfaces inclined at an acute angle to the path of movement of said threshing elements.

11. In a threshing machine, a threshing mechanism comprising a rotatable member, a threshing member in proximity to the periphery of said rotatable member, said threshing member having threshing bars on the surface adjacent said rotatable member, said bars having portions thereof arranged at an acute angle to the longitudinal axis of said machine, a plurality of elements of flexible elastic material extending longitudinally of said rotatable member adjacent its periphery and spaced angularly apart for cooperating with said threshing bars for threshing crop material fed between said rotatable member and threshing member, and rigid means engaging the outer surface and rear face of each of said elements for reinforcing said elements against abnormal distortion during the threshing operation.

12. In a threshing machine, threshing mechanism comprising a rotatable member, a threshing member adjacent said rotatable member, a plurality of rigid elongated bars carried by said rotatable member and extending longitudinally thereof, rubber bars secured to the leading faces of said elongated bars and cooperating with said threshing member for threshing crop material fed between said members, said elongated bars being so constructed and arranged as to form radial and circumferential abutments for said rubber bars for reinforcing the latter against abnormal bending and outward radial movement while in operation.

13. In a threshing machine, threshing mechanism comprising a rotatable member, a threshing member adjacent said rotatable member, a plurality of elements of flexible elastic material carried by said rotatable member and extending longitudinally of the same adjacent its periphery and spaced angularly apart for cooperating with said threshing member for threshing crop material fed between said members, and rigid means engaging the outer edge and the rear face of each of said elements for reinforcing said elements against abnormal distortion during the threshing operation.

WALTER R. DRAY.